United States Patent
Watanabe et al.

[11] Patent Number: 5,884,433
[45] Date of Patent: Mar. 23, 1999

[54] TENSION ADJUSTING APPARATUS FOR USE IN VEHICLE DOOR POWERED SLIDING DEVICE

[75] Inventors: Hirofumi Watanabe; Daisaku Matsuo, both of Yamanashi-ken, Japan

[73] Assignee: Mitsui Kinzoku Kogyo Kabushiki Kaisha, Tokyo, Japan

[21] Appl. No.: 818,394

[22] Filed: Mar. 14, 1997

[30] Foreign Application Priority Data

Mar. 19, 1996 [JP] Japan ...................................... 8-090010
Apr. 2, 1996 [JP] Japan ...................................... 8-104518

[51] Int. Cl.⁶ .................................................... E05F 11/00
[52] U.S. Cl. ................................................................. 49/360
[58] Field of Search ............................. 49/360, 279, 280, 49/138, 139, 140

[56] References Cited

U.S. PATENT DOCUMENTS

| | | | |
|---|---|---|---|
| 4,090,329 | 5/1978 | Rampel | ................................. 49/360 X |
| 4,932,715 | 6/1990 | Kramer . | |
| 4,987,793 | 1/1991 | Baumgarten . | |
| 5,046,283 | 9/1991 | Compeau et al. . | |
| 5,319,881 | 6/1994 | Kuhlman | ................................. 49/360 |
| 5,389,920 | 2/1995 | DeLand et al. . | |
| 5,737,876 | 4/1998 | Dowling | ................................. 49/360 |

FOREIGN PATENT DOCUMENTS

| | | |
|---|---|---|
| 0 636 759 | 2/1995 | European Pat. Off. . |
| 2 029 502 | 3/1980 | United Kingdom . |
| 2 168 424 | 6/1986 | United Kingdom . |

*Primary Examiner*—Jerry Redman
*Attorney, Agent, or Firm*—Browdy and Neimark

[57] ABSTRACT

A powered sliding device for sliding a vehicle sliding door along a guide rail comprises a base plate fixed to the vehicle body, a wire drum rotatably mounted on the base plate and rotated by a motor, a wire cable provided between the wire drum and the sliding door, a first holder provided in the vicinity of one end of the guide rail and having a first pulley making contact with the wire cable, a second holder provided in the vicinity of the other end of the guide rail and having a second pulley making contact with the wire cable, a tension roller provided on the base plate for making contact with the wire cable by resiliency of a spring, a flexible cable sheath covering the outer periphery of the wire cable between the first holder and the base plate and having one end to be connected to the first holder, a supporting member connected to the other end of the cable sheath. The supporting member is slidably mounted to the base plate in parallel with a running direction of the wire cable.

17 Claims, 7 Drawing Sheets

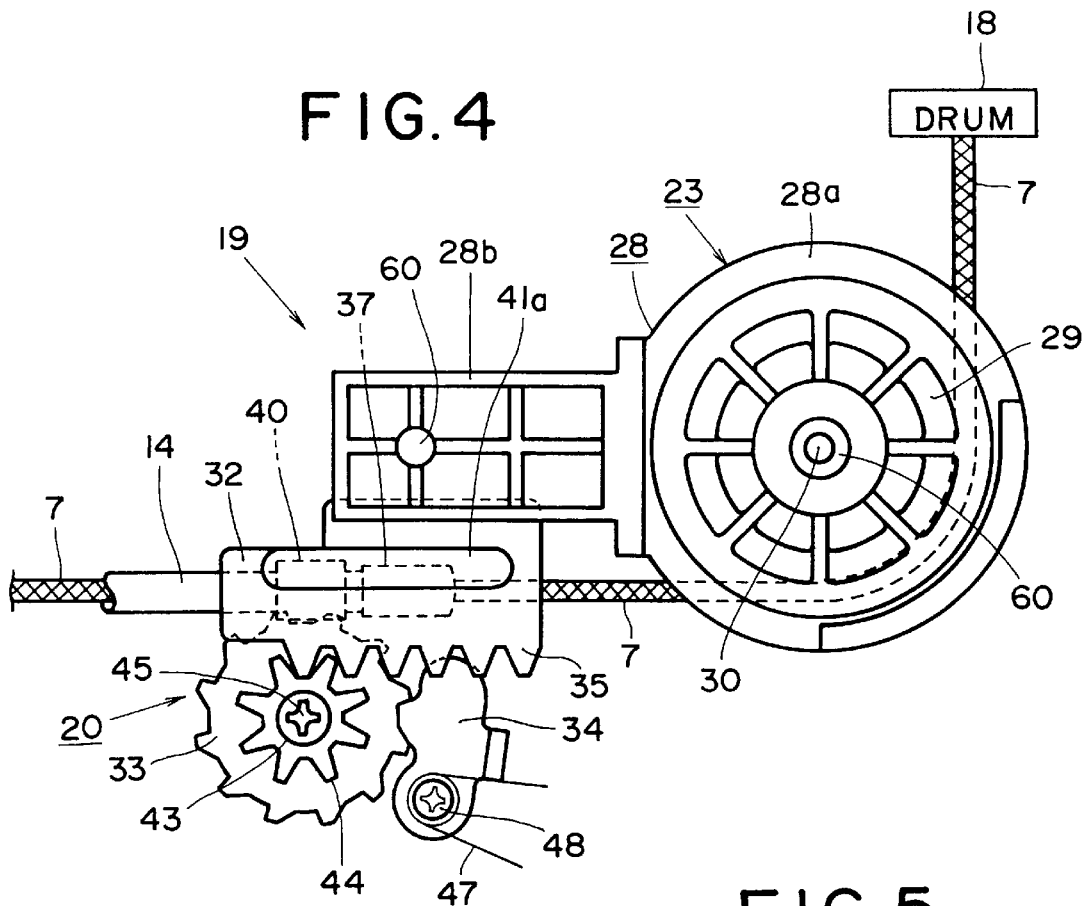
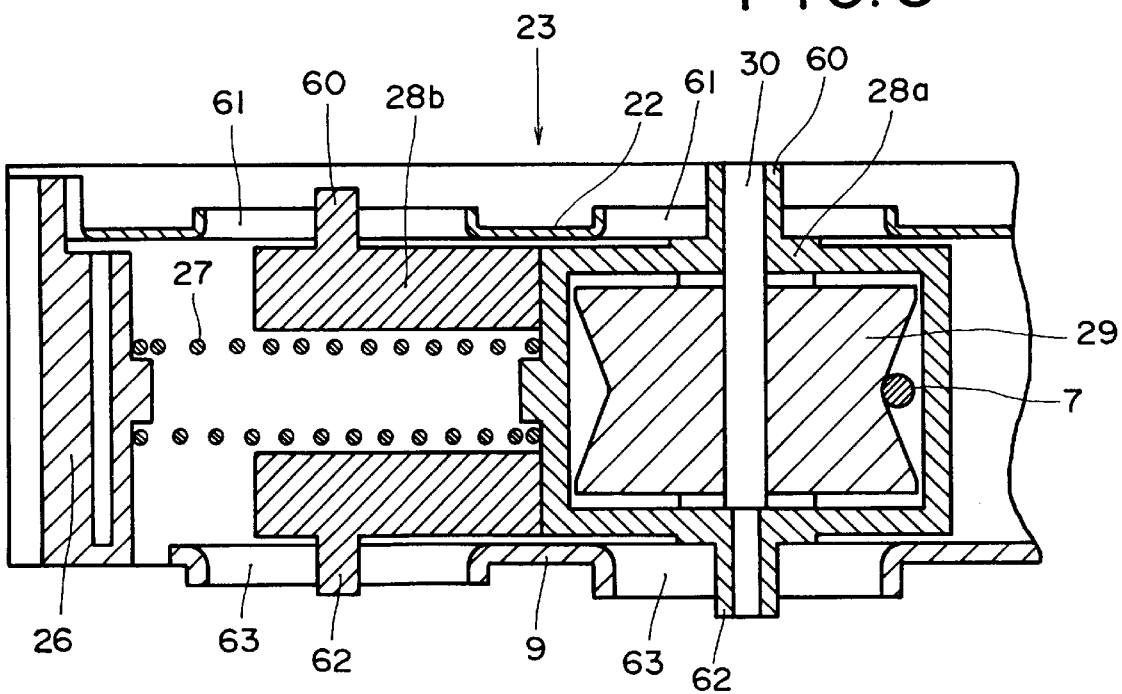

TENSION ADJUSTING APPARATUS FOR USE IN VEHICLE DOOR POWERED SLIDING DEVICE

BACKGROUND OF THE INVENTION

1. Field of the Invention

The present invention relates to a powered sliding device for a vehicle sliding door, and more particularly to a tension adjusting apparatus for use in a powered sliding device for a vehicle sliding door.

2. Description of the Related Art

There have been conventionally proposed many powered devices for sliding a sliding door which is slidably mounted to a vehicle body in a front-and-rear direction of the vehicle body under the power of the motor. For example, U.S. Pat. No. 5,046,283 discloses a powered sliding device which comprises a first wire drum connected with a first wire cable for pulling the sliding door forward, a second wire drum connected with a second wire cable for pulling the sliding door rearward and a tension spring provided between the first and second drums. The tension spring applies a predetermined tension to the wire cables by urging the first drum in the clockwise direction and urging the second drum in the counterclockwise direction.

The tension spring used in the powered sliding device has high resiliency so that it can resist a large force of the powered device with which the wire cable is pulled forward and rearward. The strong resiliency of the tension spring, however, causes difficulty in setting up the wire cable.

The present applicant (or Assignee) has proposed in U.S. patent application Ser. No. 08/702,956, UK Patent Application No. 9618139.1 and Korean Patent Application No. 96-36695 a tension mechanism which is divided into a first tension section for applying an initial tension to the wire cables after the completion of the set-up of the cables and a second tension section for absorbing looseness of the wire cables in use. In this tension mechanism, since the first tension section and the second tension section are independently provided at different positions, a plurality of processes are disadvantageously required for setting up the tension mechanism itself.

SUMMARY OF THE INVENTION

It is therefore an object of the present invention to provide a tension mechanism which can overcome the above-mentioned problems.

It is another object of the present invention to provide a tension mechanism improving operability by setting an adjusting direction of a first tension section for applying an initial tension to a cable in parallel with a moving direction of the cable.

It is still another object of the present invention to provide a tension mechanism which is capable of absorbing expansion and contraction of the cable generated in use by making a quantity of adjustment of the first tension section for applying the initial tension to the cable variable.

BRIEF DESCRIPTION OF THE DRAWINGS

The above and other objects, features and advantages of the present invention will become apparent from the detailed description of the preferred embodiments found below with reference to the accompanying drawings in which:

FIG. 4 is a plan view of the tension mechanism;

FIG. 5 is a cross-sectional view of a second tension section of the tension mechanism;

DETAILED DESCRIPTION OF THE PREFERRED EMBODIMENT

Figure 1:
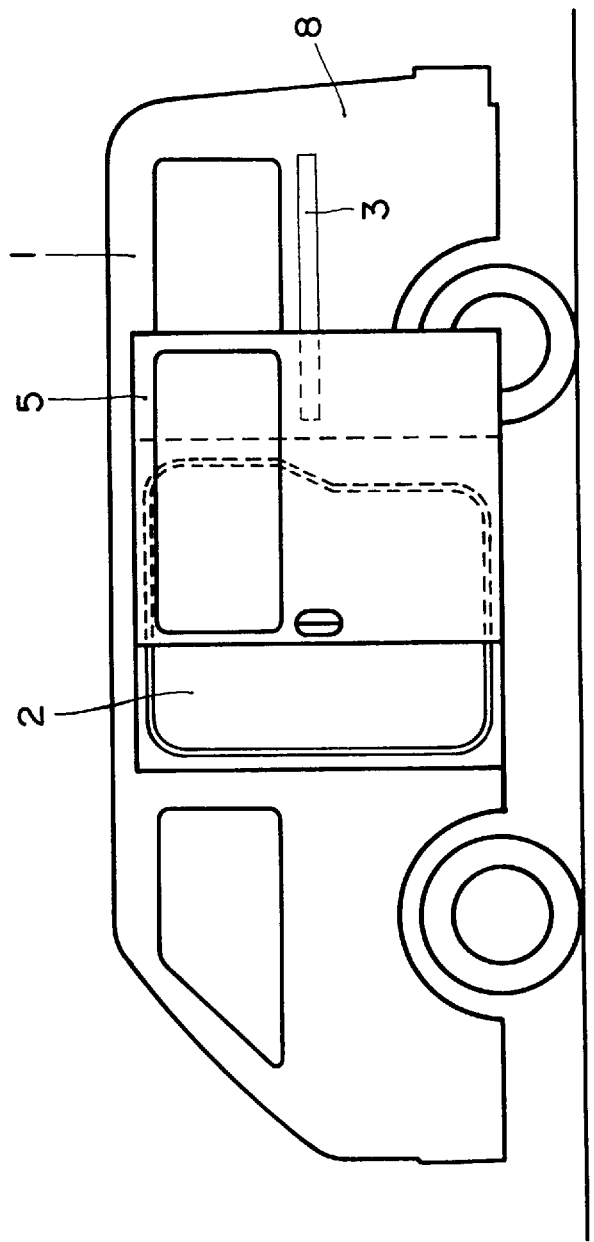
FIG. 1 is a side view showing a vehicle body and a sliding door.
Figure 2:
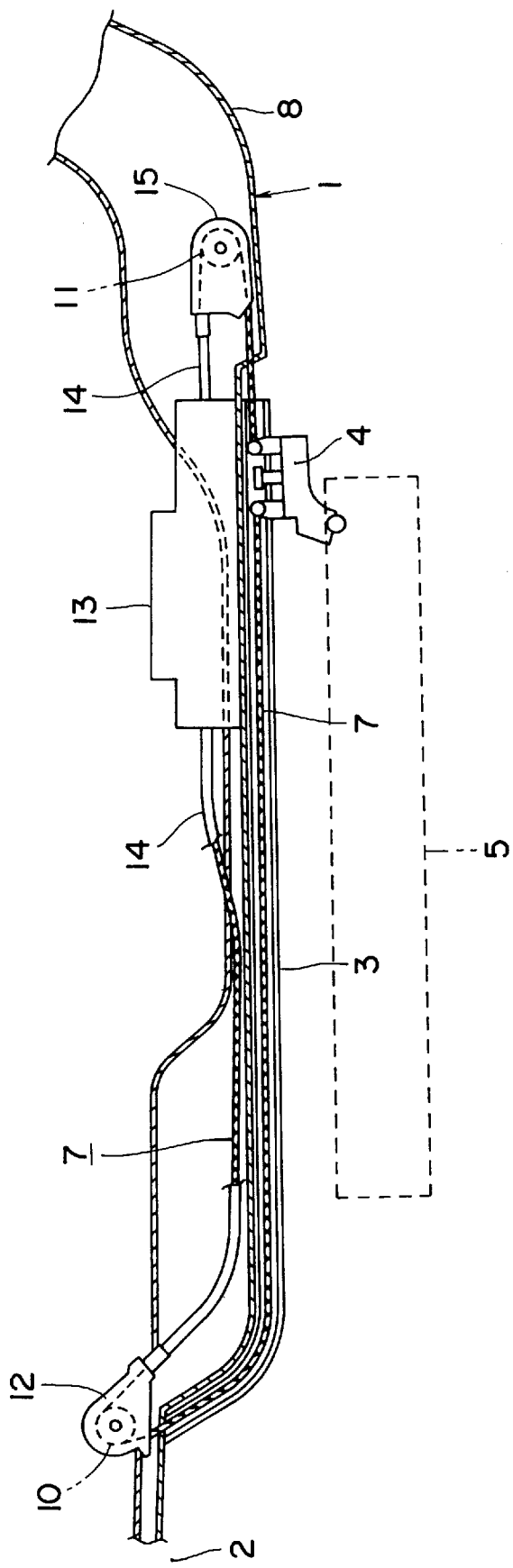
FIG. 2 is a cross-sectional view showing arrangement of a wire cable.

Referring to the accompanying drawings, as shown in FIG. 1, a vehicle body 1 has a sliding door 5 which is slidably in a longitudinal or front-and-rear direction of the body 1 between an open position opposite a rear outer side panel (or quarter panel) 8 of the body 1 and a closed position closing an entrance 4 of the body 1. A powered sliding unit 13 for sliding the door 5 is, as shown in FIG. 2, disposed on an interior side of the rear outer panel 8.

The powered sliding unit 13 is provided with a wire cable 7, one half of which is located on the interior side of the outer panel 8, and the other half of which is fitted within a guide rail 3 fixed to the outer surface of the side panel 8. A coupling bracket 4 rotatably attached to the sliding door 5 is connected with both end portions 6 of the cable 7 and is slidably engaged with the guide rail 3.

A front holder 12 having a front pulley 10 for the cable 7 is provided in the vicinity of a front end of the guide rail 3, and a rear holder 15 having a rear pulley 11 for the cable 7 is provided in the vicinity of a rear end of the guide rail 3. Each of cable 7 between the front holder 12 and the sliding unit 13 and cable 7 between the rear holder 15 and the sliding unit 13 is covered with a cable sheath 14. However, the cable 7 within the guide rail 3 is not covered with the cable sheath.

Figure 3:
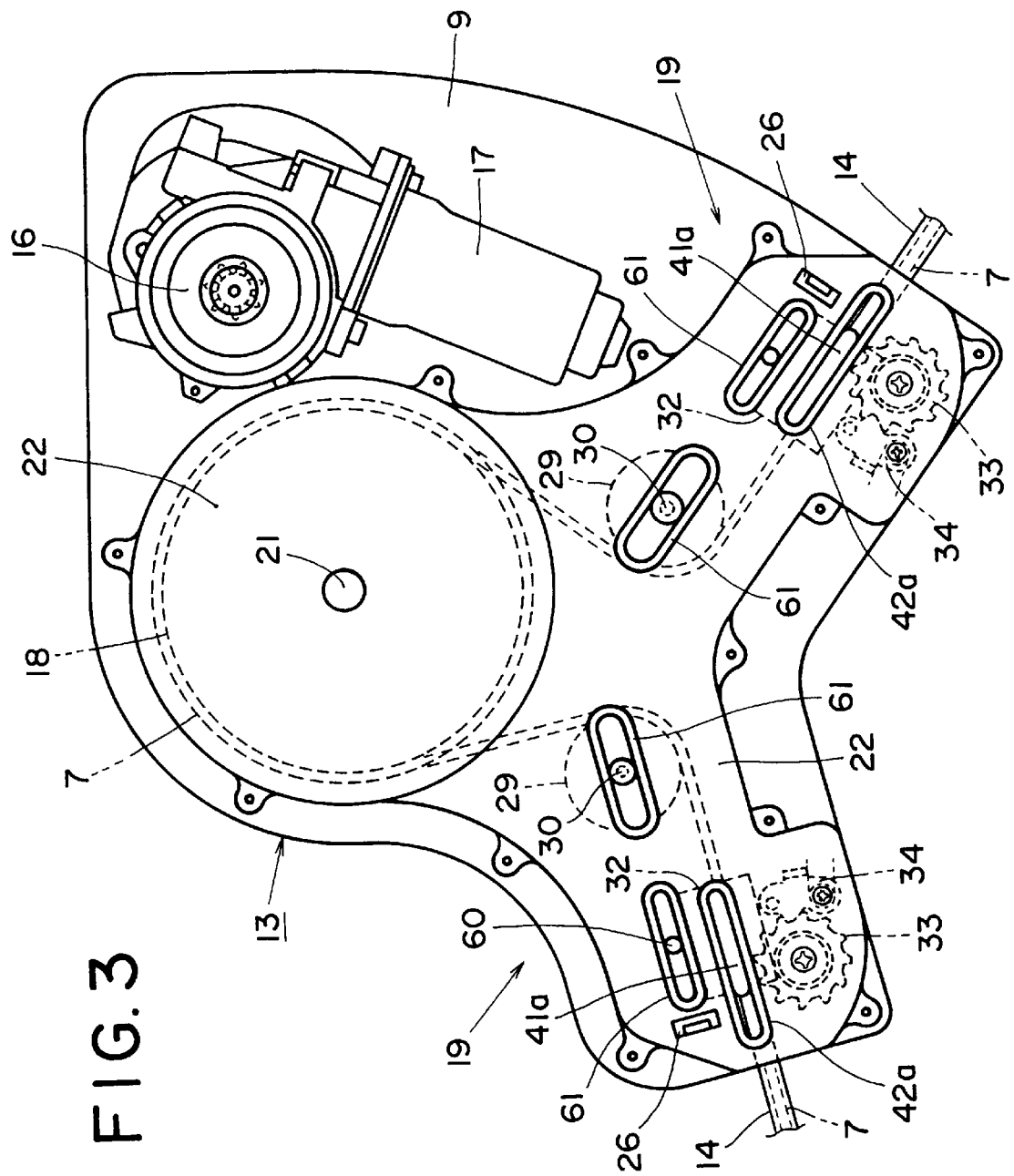
FIG. 3 is a plan view showing a powered sliding unit provided with a tension mechanism.
Figure 6:
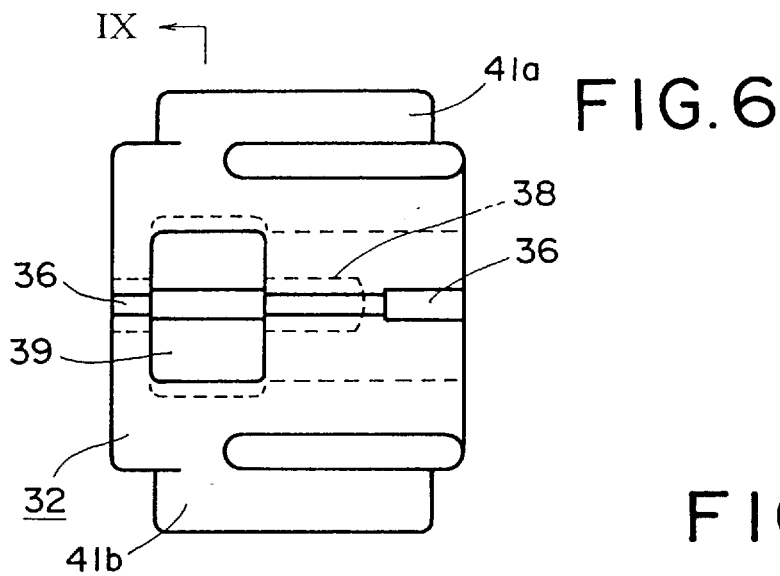
FIG. 6 is a front view showing a sheath supporting member of a first tension section of the tension mechanism.

As well shown in FIG. 3, the powered sliding unit 13 has a base plate 9 to be fixed to the body 1, an electric reversible motor 17 fixed on the base plate 9, a reduction mechanism 16, and a wire drum 18 connected with the motor 17 through the reduction mechanism 16. The wire drum 18 is supported by means of a shaft 21 between the base plate 9 and a cover plate 22 fixed on the base plate 9. The cable 7 is wound around the wire drum 18. When the wire drum 18 is rotated in an opening or closing direction by means of the motor 17, the cable 7 is pulled forward or rearward, thereby the sliding door 5 slides toward the open or closed position.

The powered sliding unit 13 is provided with at least one tension mechanism 19 which includes a first tension section 20 for applying an initial tension to the cable 7 after the completion of the set-up of the cable and a second tension section 23 for absorbing looseness of the cable 7 in use to which the initial tension is applied.

As shown in FIGS. 4 and 5, the second tension section 23 has a moving member 28 provided between the base plate 9 and the cover plate 22. The moving member 28 is formed by a cylindrical portion 28a within which a tension roller 29 is rotatably accommodated by a tension shaft 30 and a hollow member 23b fixed on the side surface of the cylindrical portion 28a. The moving member 28 includes two upper pins 60 which are slidably engaged with elongated holes 61 formed on the cover plate 22 and two lower pins 62 which are slidably engaged with elongated holes 63 formed on the base plate 9. A tension spring 27 is provided between the moving member 28 and a stationary member 26 fixed to the plates 9 and 22. More than half of the tension spring 27 is inserted into the inside of the hollow member 28b.

As shown in FIGS. 3 and 4, the cable 7 is bent at the tension roller 29 at a substantially right angle, one of the cable 7 extends from the roller 29 toward the wire drum 18, and the other of cable 7 extends from the roller 29 toward the front holder 12 (or the rear holder 15). The moving member 28 and tension roller 29 is attached to the plates 9 and 22 in such a manner that they can slide in parallel with the other of cable 7 extending toward the front holder 12 or the rear holder 15.

Figure 7:
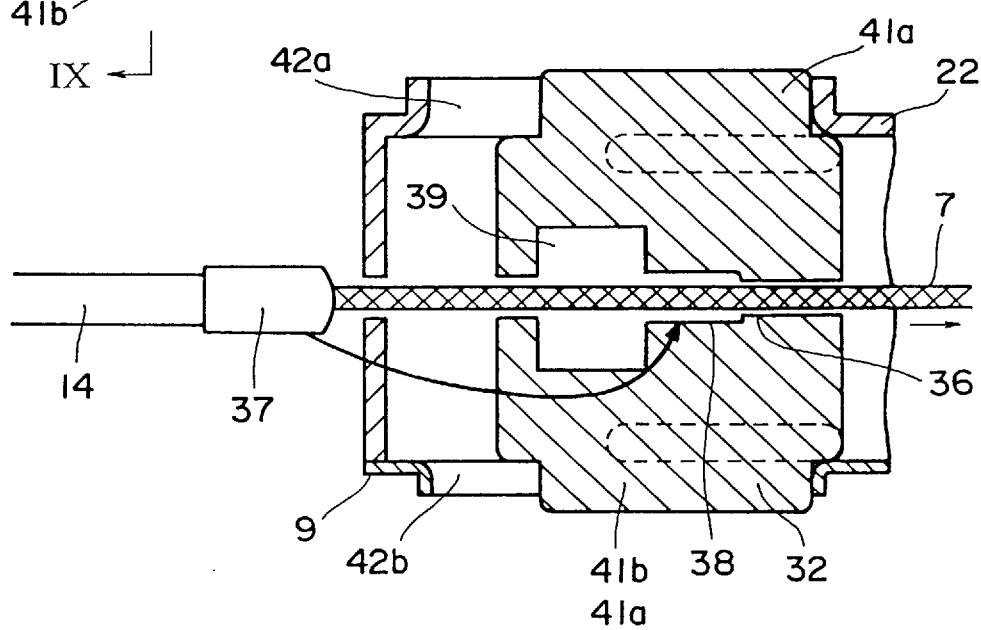
FIG. 7 is a cross-sectional view showing attachment of the sheath supporting member.
Figure 8:
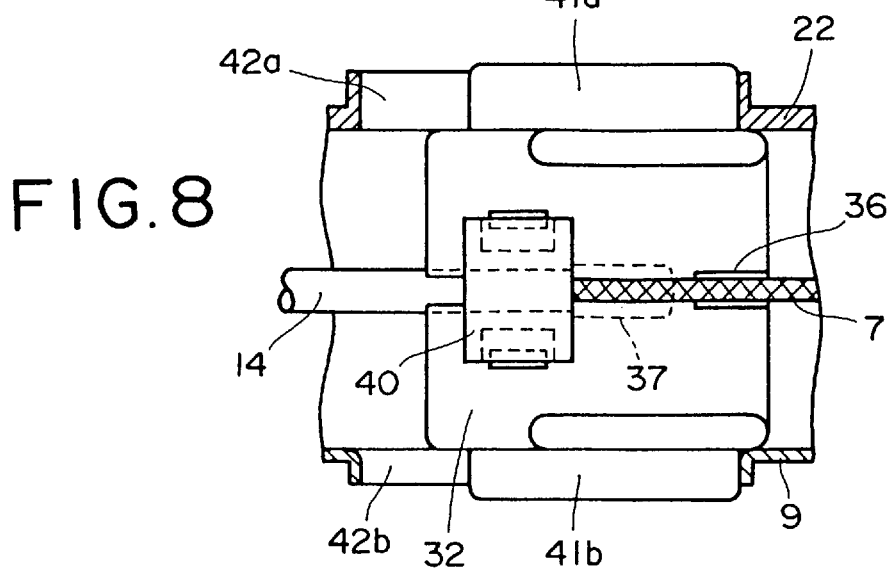
FIG. 8 is a partial sectional-view showing the state in which a head portion of a cable sheath is attached to the sheath supporting member.
Figure 9:
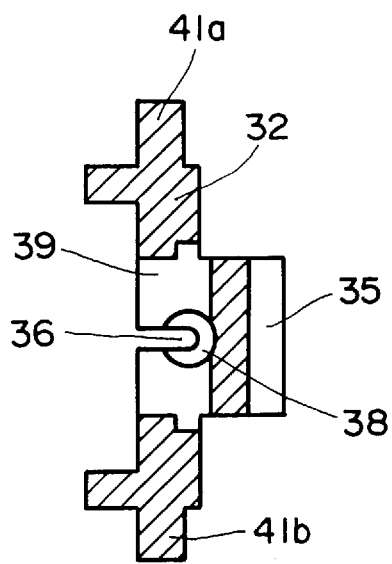
FIG. 9 is a sectional view taken along the IX—IX line in FIG. 6.
Figure 10:
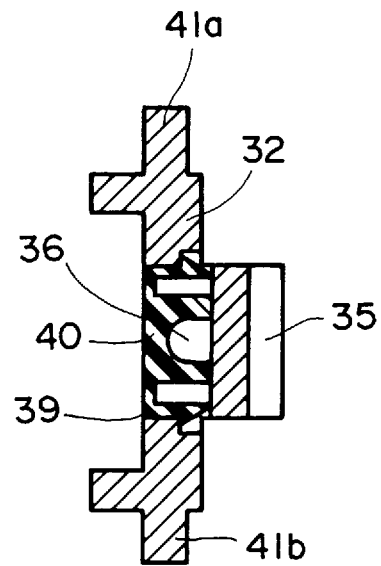
FIG. 10 is a sectional view showing the state in which a fastener is attached to the sheath supporting member.
Figure 11:
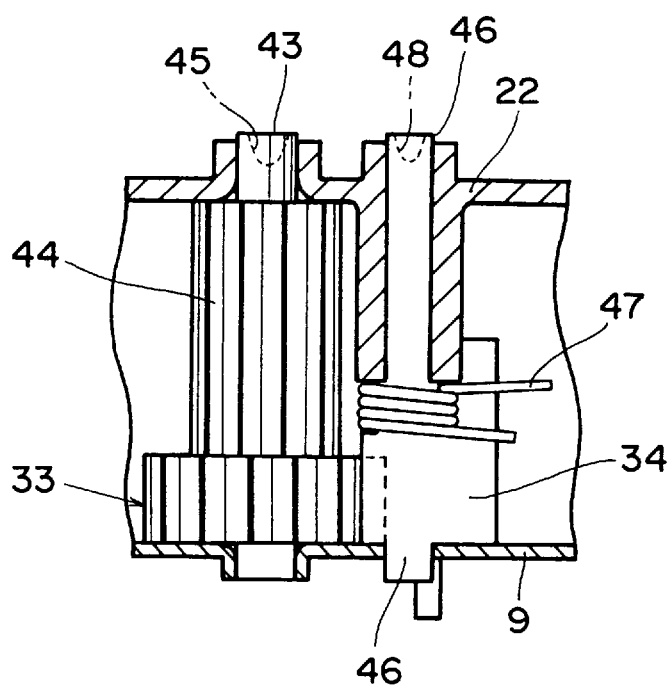
FIG. 11 is a sectional view showing a pinion gear and a ratchet wheel of the first tension section.
Figure 12:
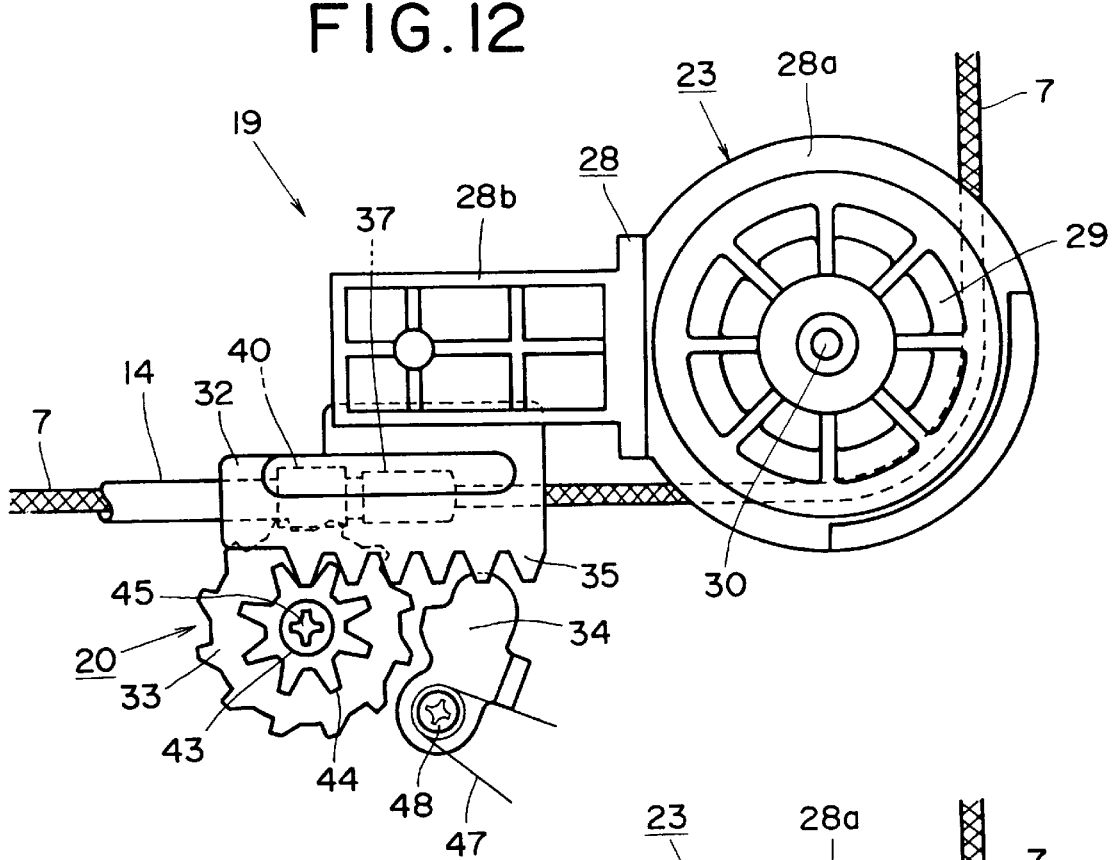
FIG. 12 is a plan view showing the tension mechanism in which a pawl lever is released from the ratchet wheel.

The first tension section 20 has a sheath supporting member 32 provided in the vicinity of the moving member 28. The sheath supporting member 32 is provided separately from the moving member 28 and moves independently from the moving member 28. The sheath supporting member 32 is disposed between the base plate 9 and the cover plate 22, as shown in FIG. 7. The sheath supporting member 32 has an upper projecting pin 41a and a lower projecting pin 41b which are slidably engaged with an elongated hole 42a of the cover plate 22 and an elongated hole 42b of the base plate 9, respectively, so as to slide in parallel with a moving direction of the tension roller 29. Inside the sheath supporting member 32 is formed a passage 36 through which the cable 7 passes. A first housing portion 38 for receiving a large diameter head 37 formed at one end of the cable sheath 14 and a second housing portion 39 communicating with the first housing portion 38 for receiving a resin fastener 40 are formed in the passage 36. When the fastener 40 is pushed into the second housing portion 39 against the spring action of the hook after inserting the cable 7 into the passage 36 and fitting the head 37 of the cable sheath 14 into the first housing portion 38, the wire sheath 14 is connected with the sheath supporting member 32. The other end of the cable sheath 14 is fixed to the front holder 12 (or the rear holding 15) using arbitrary means.

Figure 13:
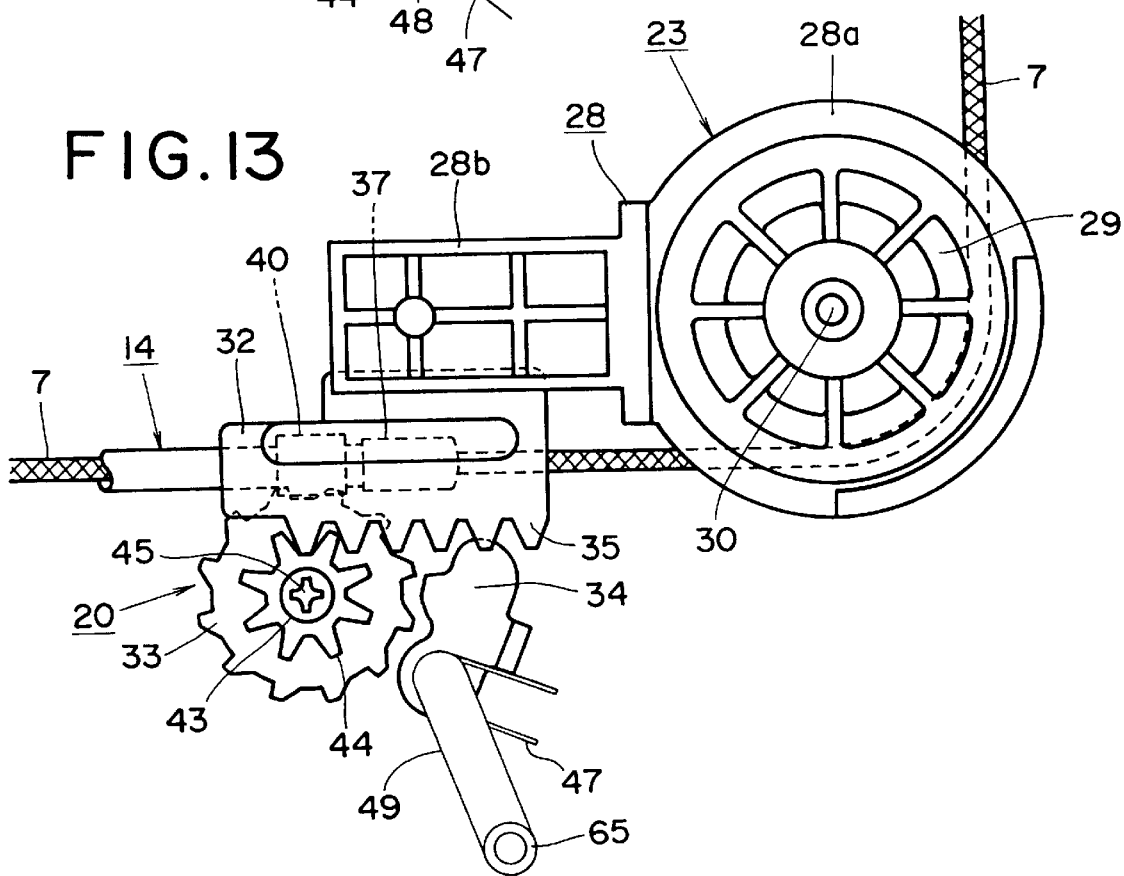
FIG. 13 is a plan view showing an embodiment in which a manual operation knob is connected with the pawl lever.

On the side surface of the sheath supporting member 32 is formed a rack 35 with which a pinion gear 44 is engaged. The pinion gear 44 is supported between the plates 9 and 22 by a shaft 43 which has on its head portion an engaging portion 45 to be engaged with a tool such as a screw driver. When the shaft 43 is rotated by the tool, the sheath supporting member 32 slides in parallel with the moving direction of the tension roller 29 by engagement between the pinion gear 44 and the rack 35. To the shaft 43 is fixed a ratchet wheel 33 with which a pawl lever 34 is engaged by the resiliency of a spring 47. The pawl lever 34 is supported between the plates 9 and 22 by a shaft 46 which has on its head portion an engaging portion 48 to be engaged with a tool such as a screw driver. When the shaft 46 is rotated by the tool against the resiliency of the spring 47, the pawl lever 34 is released from the ratchet wheel 33, thereby the pinion gear 44 becomes free. In the tension mechanism shown in FIG. 13, an operation knob 65 is connected to the shaft 46 of the pawl lever 34 through a rod 49 so that the pawl lever 34 can be manually released from the ratchet wheel 33 without using the tool.

The cable sheath 14 covering the outer periphery of the wire cable 7 is formed of a preferred material in such a manner that it is flexible but does not substantially expand or contract in the longitudinal direction. This permits a length of the cable 7 between the left sheath supporting member 32 and the front holder 12 and a length of the cable 7 between the right sheath supporting member 32 and the rear holder 15 to be always maintained constant irrespective of a position of the sheath supporting members 32. Therefore, when the pinion gear 44 is rotated by the screw driver to slide the sheath supporting member 32 in a direction away from the wire drum 18 (in the left-hand direction in FIG. 4), the length of the cable 7 between the sheath supporting member 32 and the wire drum 18 becomes long, thereby increasing the tension of the cable 7. In the present invention, since the sheath supporting member 32 moves in parallel with the longitudinal direction of the cable 7 when moving the sheath supporting member 32 to tense the cable 7, undesirable friction is not generated between the cable 7 and the sheath supporting member 32. The sheath supporting member 32 can therefore slide smoothly.

After applying the initial tension to the cable by the sheath supporting member 32 of the first tension section 20, the position of the sheath supporting member 32 is maintained by the engagement between the ratchet wheel 33 and the pawl lever 34. The cable 7 to which the initial tension has been applied is maintained to have an appropriate tension pressure by the resilient force of the tension springs 27 which urges the tension roller 29. When the tension becomes unsuitable by the expansion of the cable 7 in use, the tension should be adjusted by sliding the sheath supporting member 32 using the tool.

In order to release the tension pressure of the cable 7 for the maintenance, the pawl lever 34 is released from the ratchet wheel 33 by using the driver or an operation knob 65. The sheath supporting member 32 then moves to the right-hand side in FIG. 4 by the tension pressure of the cable 7 instantaneously, thus releasing the tension pressure of the cable 7.

While this invention has been described with reference to an illustrative embodiment, this description is not intended to construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A powered sliding device comprising:
   a base plate fixable to a vehicle body;
   a wire drum rotatably mounted on the base plate and rotated by a motor;
   a wire cable disposable between the wire drum and a vehicle sliding door for pulling the sliding door toward an open position or a closed position when the wire drum rotates;
   a first holder provided in a vicinity of one end of the guide rail and having a first pulley making contact with the wire cable;

a second holder provided in a vicinity of the other end of the guide rail and having a second pulley making contact with the wire cable;

a tension roller provided on the base plate for making contact with the wire cable by resiliency of a first spring;

a first flexible cable sheath covering an outer periphery of the wire cable between the first holder and the base plate and having one end connected to the first holder, said first cable sheath having substantially no expansibility and no contractibility in a longitudinal direction thereof; and a first supporting member connected to the other end of the first cable sheath, said first supporting member being slidably mounted to the base plate in parallel with a running direction of the wire cable.

2. A powered sliding device according to claim 1, further comprising a second flexible cable sheath covering the outer periphery of the wire cable between the second holder and the base plate and having one end to be connected to the second holder, said second cable sheath having substantially no expansibility and no contractibility in a longitudinal direction thereof, a second supporting member connected to the other end of the second cable sheath, and said second supporting member being slidably mounted to the base plate in parallel with a running direction of a corresponding wire cable.

3. A powered sliding device according to claim 1, wherein said wire cable extends straight from the wire drum toward the tension roller, turns at the tension roller at a substantially right angle, and then extends straight toward the first supporting member.

4. A powered sliding device according to claim 1, wherein said tension roller is slidable in parallel with a sliding direction of the first supporting member.

5. A powered sliding device according to claim 1, further comprising a large diameter head formed at the other end of the first cable sheath; said first supporting member having a passage through which the wire cable runs, a first housing portion for receiving the head and a second housing portion communicating with the first housing portion; and a fastener engaged with the second housing portion for preventing the head from being detached from the first housing portion.

6. A powered sliding device according to claim 1, further comprising holding means for maintaining a position of the first supporting member against the tension of the wire cable.

7. A powered sliding device according to claim 6, wherein said holding means has a ratchet wheel and a pawl lever engaged with the ratchet wheel by resiliency of a second spring.

8. A powered sliding device according to claim 7, wherein said pawl lever has an engaging portion with which a tool is engageable.

9. The door-sliding device according to claim 8, wherein the tool comprises a screwdriver.

10. A powered sliding device according to claim 7, further comprising an operation knob connected to the pawl lever for manually releasing the pawl lever from the ratchet wheel.

11. A powered sliding device according to claim 1, further comprising a rack formed on the first supporting member, and a pinion gear engaged with the rack and having an engaging portion with which a screw driver is engageable.

12. A powered sliding device according to claim 10, wherein said pinion gear has holding means for maintaining a position of the first supporting member against the tension of the wire cable.

13. A powered sliding device according to claim 12, wherein said holding means has a ratchet wheel and a pawl lever engaged with the ratchet wheel by resiliency of a second spring.

14. A powered sliding device according to claim 13, wherein said ratchet wheel is coaxial with the pinion gear.

15. A powered sliding device according to claim 13, wherein said pawl lever has an engaging portion with which a tool is engageable.

16. The door-sliding device according to claim 15, wherein the tool comprises a screwdriver.

17. A powered sliding device according to claim 13, further comprising an operation knob connected to the pawl lever for manually releasing the pawl lever from the ratchet wheel.

* * * * *